United States Patent [19]

Kanda et al.

[11] Patent Number: 5,700,895
[45] Date of Patent: Dec. 23, 1997

[54] ETHYLENE-α-OLEFIN COPOLYMER AND MOLDED ARTICLE THEREOF

[75] Inventors: Yuji Kanda, Ichihara; Toshiyuki Kokubo, Funabashi; Yufu Sato; Toshio Sasaki, both of Ichihara; Hiroyuki Shiraishi, Sodegaura; Yuji Shigematsu, Ichihara, all of Japan

[73] Assignee: Sumitomo Chemical Company, Limited, Osaka, Japan

[21] Appl. No.: 570,559

[22] Filed: Dec. 11, 1995

Related U.S. Application Data

[63] Continuation-in-part of Ser. No. 294,941, Aug. 17, 1994, abandoned.

[30] Foreign Application Priority Data

Aug. 23, 1993 [JP] Japan .................................. 5-207496

[51] Int. Cl.$^6$ .................................................. C08F 210/02
[52] U.S. Cl. .......................... 526/348; 526/161; 526/348.6
[58] Field of Search ............................ 526/161, 348, 526/348.6

[56] References Cited

FOREIGN PATENT DOCUMENTS

| 0164215 | 12/1985 | European Pat. Off. . |
| 0298700 | 1/1989 | European Pat. Off. . |
| 0452920 | 10/1991 | European Pat. Off. . |
| 0520816 | 12/1992 | European Pat. Off. . |
| 0588567 | 3/1994 | European Pat. Off. . |
| 2019419 | 10/1979 | United Kingdom . |

OTHER PUBLICATIONS

*Patent Abstracts of Japan*, vol. 12, No. 223 (C–507), 24 Jun. 1988 & JP–A–63 020 309 (Japan Synthetic Rubber Co., Ltd.), 28 Jan. 1988.

*Polymer Journal*, vol. 24, No. 9, 15 Sep. 1992, Tokyo, pp. 939–949, XP330633, S. Hosoda, A. Uemura, "Effect of the Structural Distribution on the Mechanical Properties of Linear Low–Density Polyethylenes".

*Patent Abstracts of Japan*, vol. 12, No. 223 (C–507); 24 Jun. 1988 & JP–A–63 020 039 (Japan Synthetic Rubber Co.; Ltd.); 28 Jan. 1988.

*Primary Examiner*—David W. Wu
*Attorney, Agent, or Firm*—Watson Cole Stevens Davis, PLLC

[57] ABSTRACT

A novel ethylene-α-olefin copolymer and a molded article formed therefrom, wherein (A) a density is 0.870 to 0.945 g/cm$^3$, (B) a relation between an activation energy of flow Ea (J/mole K) obtained by measurement of viscoelasticity at at least three temperatures in the molten state and a melt flow rate MFR (g/10 min) satisfies the following equation (1):

$$\log Ea \geq 4.6 - 0.04 \times \log MFR \qquad (1),$$

(C) a coefficient Cx of variation of chemical composition distribution represented by the following equation (2) is 0.40 to 0.80:

$$Cx = \sigma/SCB_{ave} \qquad (2)$$

wherein σ is a standard deviation of chemical composition distribution (1/1,000 C) and $SCB_{ave}$ is the average of short chain branchings per 1,000 C (1/1,000 C), (D) a ratio of a weight average molecular weight Mw to a number average molecular weight Mn (Mw/Mn) is 3 to 20, and (F) a ratio (TVR) of trans-vinylene type carbon-carbon double bonds to total carbon-carbon double bonds as determined with an infrared absorption spectrum being 1 to 30%.

9 Claims, No Drawings

ETHYLENE-α-OLEFIN COPOLYMER AND MOLDED ARTICLE THEREOF

CROSS-REFERENCE TO RELATED APPLICATION

This application is a continuation-in-part application of our earlier U.S. application Ser. No. 08/294,941 filed on Aug. 17, 1994, now abandoned.

BACKGROUND OF THE INVENTION

The present invention relates to an ethylene-α-olefin copolymer having excellent physical properties and moldability and to a molded article thereof. More particularly, it relates to an ethylene-α-olefin copolymer which exhibits excellent moldability and physical properties required for use as films, blow moldings, injection-moldings such as high transparency, high gloss, high impact strength and high modulus. Further the present invention relates to a molded article, especially a film, obtained from said ethylene-α-olefin copolymer.

Linear, low-density polyethylene (LLDPE) prepared by ionic polymerization which is a copolymer of ethylene and an α-olefin exhibits excellent mechanical properties, such as impact strength, tensile strength and resistance to environmental stress-cracking, as compared with those of low-density polyethylene (LDPE) prepared by radical polymerization, and has therefore been used widely as starting materials for films, blow moldings and injection moldings.

However, LLDPE has certain undesirable properties such as low melt tension and unsatisfactory transparency.

For example, when a film is formed from a polymer having a low melt tension by a conventional inflation molding method, the bubble stability is inferior and the film-formation is difficult. Moreover, when a polymer having a low melt tension is used in the blow molding processes, the extruded molten parison deforms greatly owing to its own weight, and hence, its use is limited.

Therefore, in a part of utilization field, LDPE is used or LDPE is mixed with LLDPE for the purpose of enhancing the transparency and melt tension of LLDPE. However, this has such problems that a labor hour is required for the mixing and when LDPE is mixed the mechanical strength which is the original feature of LLDPE is lowered.

Under such circumstances, the present inventors have made extensive research on the melt tension and transparency of LLDPE, and have consequently found a novel specific ethylene-α-olefin copolymer whose optical properties such as transparency, gloss and the like and moldability have greatly been improved without impairing the mechanical properties including impact strength, tensile strength, stiffness and the like.

SUMMARY OF THE INVENTION

An object of this invention is to provide an ethylene-α-olefin copolymer having high melt tension and high transparency and satisfying all the above-mentioned physical properties and moldability.

Another object of this invention is to provide a molded article, especially a film, comprising an ethylene-α-olefin copolymer having high melt tension and high transparency and satisfying all the above-mentioned physical properties.

Other objects and advantages of this invention will become apparent from the following description.

According to the present invention, there is provided an ethylene-α-olefin copolymer wherein (A) a density is 0.870 to 0.945 g/cm$^3$, (B) a relation between an activation energy of flow Ea (J/mole K) determined by measurement of dynamic visco-elasticity at least three temperatures in the molten state and a melt flow rate MFR (g/10 min) satisfies the conditions of the following equation (1):

$$\log Ea \geq 4.6 - 0.04 \times \log MFR \quad (1)$$

(C) a coefficient Cx of variation of chemical composition distribution represented by the following equation (2) is 0.40 to 0.80:

$$Cx = \sigma/SCB^{ave} \quad (2)$$

wherein σ is a standard deviation of composition distribution (1/1,000 C) and $SCB^{ave}$ is the average of short chain branchings per 1,000 C (1/1,000 C), (D) a ratio of a weight average molecular weight Mw to a number average molecular weight Mn (Mw/Mn) is 3 to 20.

The present invention also provides a molded article formed from the above ethylene-α-olefin copolymer, and (F) a ratio (TVR) of trans-vinylene type carbon-carbon double bonds to total carbon-carbon double bonds as determined with an infrared absorption spectrum being 1 to 30%.

DETAILED DESCRIPTION OF THE INVENTION

In the ethylene-α-olefin copolymer of the present invention, (A) it is essential that the density thereof be 0.870 to 0.945 g/cm$^3$. The density is preferably 0.880 to 0.940 g/cm$^3$, more preferably 0.885 to 0.935 g/cm$^3$. When the density is less than 0.870 g/cm$^3$, the surface tackiness of molded article formed from the copolymer becomes great and the rigidity thereof becomes low. This is not desirable. Also, when the density exceeds 0.945 g/cm$^3$, the improvement of the transparency of the molded article is poor and the impact strength becomes low. This is not desirable. Incidentally, the density referred to herein is a value determined by measurement according to JIS K6760.

Also, in the ethylene-α-olefin copolymer of this invention, (B) it is necessary that the relation between the activation energy of flow Ea (J/mole K) determined by measurement of dynamic viscoelasticity at at least three temperatures in the molten state and the melt flow rate MFR (g/10 min) satisfy the conditions of the following equation (1):

$$\log Ea \geq 4.6 - 0.04 \times \log MFR \quad (1).$$

In order to determine the activation energy of flow Ea, the ethylene-α-olefin copolymer of the present invention is heated to a temperature of, for example, about 130° C. to about 220° C. to form a melt; the frequency dependency of the dynamic viscoelasticity of the melt is then measured at at least three temperatures set at a space of 15° C. or more; and master curves of storage elastic modulus G' and loss elastic modulus G" at the desired temperature are drawn from the results obtained.

At this time, the following relations hold:

G' (ω, T)=$b_T$G' ($\omega a_S$, T")

G" (ω, T)=$b_T$G" ($\omega a_T$, T")

and $\omega_r/\omega$ is taken as a shift factor $a_T$. In the above equations,

ω: frequency in the measurement,

T: temperature in the measurement (absolute temperature),

T": temperature of the master curve (absolute temperature), $\omega_s$: frequency of G' or G" corresponding to G' ($\omega$, T) or G" ($\omega$, T) shifted to said frequency dependency curve of T", $b_T$: amount of shift in the G' or G" axis direction.

Reciprocal of T is plotted on the axis of abscissa and natural logarithm of $a_T$ at said temperature is plotted on the axis of ordinate to draw an approximate straight line. The inclination of the straight line formed thereby is multiplied by the gas constant (R) and the absolute value of the value obtained thereby is taken as the activation energy of flow Ea.

Also, MFR is measured according to the method prescribed in JIS K6760.

The ethylene-α-olefin copolymer of the present invention exhibits excellent optical properties such as transparency, gloss and the like and high melt tension as compared with a conventional LLDPE having a small activation energy of flow Ea.

When the relation between the activation energy of flow Ea and the MFR does not satisfy the conditions of the equation (1), the transparency-improving effect is poor and the melt tension does not become sufficiently satisfactory.

That the activation energy of flow Ea is large in the ethylene-α-olefin copolymer of the present invention suggests that the side chains of the polymer are sufficiently entangled with one another. Such a viscoelasticity parameter has a molecular weight dependency.

And, its structure is considered to contribute to improvement of transparency and melt properties due to inhibition of crystal growth.

In the ethylene-α-olefin copolymer of the present invention, (C) the coefficient Cx of variation of chemical composition distribution represented by the following equation (2) is 0.40 to 0.80, preferably 0.45 to 0.75:

$$Cx = \sigma/SCB_{ave} \tag{2}$$

wherein σ is a standard deviation of composition distribution (1/1000 C) and $SCB_{ave}$ is the average of short chain branchings per 1000 C (1/1000 C).

When the coefficient Cx of variation of chemical composition distribution exceeds 0.80, the surface tackiness of a molded article becomes large and the balance between rigidity and impact resistance becomes bad. This is not desirable. When the coefficient Cx of variation of chemical composition distribution is less than 0.40, the melt tension becomes low and the moldability becomes bad. This is not desirable.

The outline of measurement of the coefficient Cx of variation of chemical composition distribution is as follows:

The ethylene-α-olefin copolymer of the present invention is dissolved in a solvent heated to the predetermined temperature, the resulting solution is placed in the column of a column oven, and the temperature of the oven is lowered.

Subsequently, the temperature is elevated to the predetermined temperature while the relative concentration and branching degree of the copolymer distilled out are measured by an FT-IR connected to the column. The temperature is elevated to the final temperature while the relative concentration and branching degree of the copolymer distilled out are determined at each of the predetermined temperatures.

A composition distribution curve is drawn from the relative concentration and branching degree obtained, and from the curve, the coefficient Cx of variation of chemical composition distribution which indicates the average composition and the breadth of distribution is obtained.

In the ethylene-α-olefin copolymer of the present invention, (D) the ratio of the weight average molecular weight Mw to the number average molecular weight Mn (Mw/Mn) is 3 to 20, preferably 3 to 10 and more preferably 3 to 5.

When Mw/Mn is less than 3, the load in the molding becomes large, which is not desirable. When Mw/Mn is more than 20, a sufficient strength cannot be imparted to a molded article of the copolymer. This is not desirable.

The ethylene-α-olefin copolymer of the present invention has preferably (E) a weight average molecular weight of 30,000 to 600,000, more preferably 40,000 to 400,000. When (E) the weight average molecular weight of the copolymer is less than 30,000, the mechanical strength tends to be lowered and when the weight average molecular weight is more than 600,000 the moldability tends to become poor.

The ethylene-α-olefin copolymer of the present invention can be produced by copolymerizing ethylene with an α-olefin in the presence of an olefin-polymerizing catalyst.

The α-olefin has 3 to 30 carbon atoms and include, for example, propylene, butene-1, pentene-1, hexene-1, heptene-1, octene-1, nonene-1, decene-1, octadecene-1, eicosene-1, 4-methylpentene-1, 4-methylhexene-1, 4,4-dimethylpentene-1 and the like. These olefins may be used in combination of two or more. Among the above olefins, preferable are those having 4 to 8 carbon atoms such as butene-1, pentene-1, hexene-1, octene-1 and 4-methylpentene-1 in view of availability and the quality of the resulting copolymer.

The α-olefin content in the ethylene-α-olefin copolymer of the present invention is preferably 0.4 to 25 mole %.

The copolymer according to the present invention has (F) a ratio (TVR) of trans-vinylene type carbon-carbon double bonds to total carbon-carbon double bonds as determined with an infrared absorption spectrum being 1 to 30%, preferably being 1 to 20%, more preferably 1 to 15%.

It is considered that among the ethylene-α-olefin copolymers having the lower TVR, there are some ones which indicates the peculiarity of the terminal structure of the copolymer by specifying the relation (B) of the present invention; namely, long length of branchings are formed in side chains of the copolymer. The inventors believe that this structure contributes to the improvements of transparency and melt properties.

In the copolymer according to the present invention, the number (TVN) of trans-vinylene type carbon-carbon double bonds per 2000 carbons is preferably less than 0.3.

Determination of said TVR and TVN are later described.

The olefin-polymerizing catalyst used in the production of the ethylene-α-olefin copolymer of the present invention is, for example, an olefin-polymerizing catalyst comprising (a) a titanium compound having at least one titanium-nitrogen bond, (b) an organomagnesium compound and (c) a halogen-containing aluminum compound.

The titanium compound (a) used in the present invention has at least one titanium-nitrogen bond and includes, for example, titanium compounds represented by the general formula:

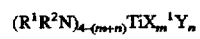

wherein $R^1$ and $R^2$ may be the same as or different from each other and each represents a hydrocarbon group having 1 to 30 carbon atoms; $X^1$ represents a halogen; Y represents an alkoxy group; m represents a numeral satisfying $0 \leq m \leq 3$; n represents a numeral satisfying $0 \leq n \leq 3$; and (m+n) satisfies $0 \leq (m+n) \leq 3$.

In the above general formula, the halogen represented by $X^1$ includes chlorine, bromine, iodine and the like, and chlorine is preferable in view of catalytic activity. In the above general formula, Y includes alkoxy groups having 1 to 20 carbon atoms such as methoxy, ethoxy, propoxy, butoxy and 2-ethylhexyloxy groups, and there is no particular restriction in view of catalytic activity.

In the above general formula, when (m+n) is more than 3, it follows that free $TiCl_4$ exists, and the chemical composition distribution of the copolymer becomes wide owing thereto. This is not desirable.

Among such titanium compounds, when $R^1$ and $R^2$ are each an aliphatic hydrocarbon residue, particularly those wherein the number of carbon atoms is 8–10 are preferred. Further, even when the number of carbon atoms is less than 8, those compounds wherein m is 0 or 2 are more preferred because they give a copolymer having a narrower chemical composition distribution (CCD).

The titanium compound represented by the above general formula includes, for example, bis(dimethylamino)titanium dichloride, tetrakis(dimethylamino)titanium, bis(diethylamino)titanium dichloride, tetrakis(diethylamino)titanium, bis(diisopropylamino)titanium dichloride, tetrakis(diisopropylamino)titanium, bis(dipropylamino)titanium dichloride, tetrakis(dipropylamino)titanium, bis(diisobutylamino)titanium dichloride, tetrakis(diisobutylamino)titanium, bis(di-tert-butylamino)titanium dichloride, tetrakis(di-tert-butylamino)titanium, bis(dibutylamino)titanium dichloride, tetrakis(dibutylamino)titanium, bis(dihexylamino)titanium dichloride, tetrakis(dihexylamino)titanium, dioctylaminotitanium trichloride, bis(dioctylamino)titanium dichloride, tris(dioctylamino)titanium chloride, tetrakis(dioctylamino)titanium, didecylaminotitanium trichloride, bis(didecylamino)titanium dichloride, tris(didecylamino)titanium chloride, tetrakis(didecylamino)titanium, dioctadecylaminotitanium trichloride, bis(dioctadecylamino)titanium dichloride, tris(dioctadecylamino)titanium chloride, tetrakis(dioctadecylamino)titanium, ethoxy(dimethylamino)titanium dichloride, ethoxy(diethylamino)titanium dichloride, ethoxy(dipropylamino)titanium dichloride, ethoxy(diisopropylamino)titanium dichloride, ethoxy(diisobutyamino)titanium dichloride, ethoxy(di-tert-butylamino)titanium dichloride, ethoxy(dibutylamino)titanium dichloride, ethoxy(dihexylamino)titanium dichloride, ethoxy(dioctylamino)titanium dichloride, propoxy(dimethylamino)titanium dichloride, propoxy(diethylamino)titanium dichloride, propoxy(dipropylamino)titanium dichloride, propoxy(diisopropylamino)titanium dichloride, propoxy(diisobutylamino)titanium dichloride, propoxy(di-tert-butylamino)titanium dichloride, propoxy(dibutylamino)titanium dichloride, propoxy(dihexylamino)titanium dichloride, propoxy(dioctylamino)titanium dichloride, butoxy(dimethylamino)titanium dichloride, butoxy(diethylamino)titanium dichloride, butoxy(dipropylamino)titanium dichloride, butoxy(diisopropylamino)titanium dichloride, butoxy(diisobutylamino)titanium dichloride, butoxy(di-tert-butylamino)titanium dichloride, butoxy(dibutylamino)titanium dichloride, butoxy(dihexylamino)titanium dichloride, butoxy(dioctylamino)titanium dichloride, hexyloxy(dioctylamino)titanium dichloride, 2-ethylhexyloxy(dioctylamino)titanium dichloride, decyloxy(dioctylamino)titanium dichloride, ethoxy(didecylamino)titanium dichloride, hexyloxy(didecylamino)titanium dichloride, 2-ethylhexyloxy(didecylamino)titanium dichloride, decyloxy(didecylamino)titanium dichloride, ethoxy(dioctadecylamino)titanium dichloride, 2-ethylhexyloxy(dioctadecylamino)titanium dichloride, decyloxy(dioctadecylamino)titanium dichloride, hexyloxybis(dioctylamino)titanium chloride, 2-ethylhexyloxybis(dioctylamino)titanium chloride, decyloxybis(dioctylamino)titanium chloride, hexyloxybis(didecylamino)titanium chloride, 2-ethylhexyloxybis(didecylamino)titanium chloride, decyloxy(didecylamino)titanium chloride, hexyloxybis(dioctadecylamino)titanium chloride, 2-ethylhexyloxybis(dioctadecylamino)titanium chloride, decyloxybis(dioctadecylamino)titanium chloride, methoxytris(dimethylamino)titanium, ethoxytris(dimethylamino)titanium, butoxytris(dimethylamino)titanium, hexyloxytris(dimethylamino)titanium, 2-ethylhexyloxytris(dimethylamino)titanium, decyloxytris(dimethylamino)titanium, methoxytris(diethylamino)titanium, ethoxytris(diethylamino)titanium, butoxytris(diethylamino)titanium, hexyloxytris(diethylamino)titanium, 2-ethylhexyloxytris(diethylamino)titanium, decyloxytris(diethylamino)titanium, methoxytris(dipropylamino)titanium, ethoxytris(dipropylamino)titanium, butoxytris(dipropylamino)titanium, hexyloxytris(dipropylamino)titanium, 2-ethylhexyloxytris(dipropylamino)titanium, decyloxytris(dipropylamino)titanium, methoxytris(dibutylamino)titanium, ethoxytris(dibutylamino)titanium, butoxytris(dibutylamino)titanium, hexyloxytris(dibutylamino)titanium, 2-ethylhexyloxytris(dibutylamino)titanium, decyloxytris(dibutylamino)titanium, methoxytris(dihexylamino)titanium, ethoxytris(dihexylamino)titanium, butoxytris(dihexylamino)titanium, hexyloxytris(dihexylamino)titanium, 2-ethylhexyloxytris(dihexylamino)titanium, decyloxytris(dihexylamino)titanium, methoxytris(dioctylamino)titanium, ethoxytris(dioctylamino)titanium, butoxytris(dioctylamino)titanium, hexyloxytris(dioctylamino)titanium, 2-ethylhexyloxytris(dioctylamino)titanium, decyloxytris(dioctylamino)titanium, methoxytris(didecylamino)titanium, ethoxytris(didecylamino)titanium, butoxytris(didecylamino)titanium, hexyloxytris(didecylamino)titanium, 2-ethylhexyloxytris(didecylamino)titanium, decyloxytris(didecylamino)titanium, methoxytris(dioctadecylamino)titanium, ethoxytris(dioctadecylamino)titanium, butoxytris(dioctadecylamino)titanium, hexyloxytris(dioctadecylamino)titanium, 2-ethylhexyloxytris(dioctadecylamino)titanium and decyloxytris(dioctadecylamino)titanium.

Among the above titanium compounds, particularly preferable are those of the above general formula wherein m is 1 because they give the highest catalytic activity. Examples of such compounds include tris(dioctylamino)titanium chloride, tris(didecylamino)titanium chloride, tris(dioctadecylamino)titanium chloride, hexyloxybis(dioctylamino)titanium chloride, 2-ethylhexyloxybis(dioctylamino)titanium chloride, decyloxybis(dioctylamino)titanium chloride, hexyloxybis(didecylamino)titanium chloride, 2-ethylhexyloxybis(didecylamino)titanium chloride, decyloxybis(didecylamino)titanium chloride, hexyloxybis(dioctadecylamino)titanium chloride, 2-ethylhexyloxybis(dioctadecylamino)titanium chloride and decyloxybis(dioctadecylamino)titanium chloride.

Such titanium compounds (a) can be synthesized, for example, by the methods described in JP-B-41-5397; JP-B-42-11646; H. Bürger et al., J. of Organomet. Chem., 108 (1976), 69–84; and H. Büger, Z. Anorg. allg. Chem. 365, 243–254 (1991) and the like.

According to these methods, the titanium compound can be synthesized, for example, by (1) reacting (i) a secondary amine compound represented by the general formula $R^1R^2NH$ in which $R^1$ and $R^2$ may be the same as or different from each other and each represents a hydrocarbon group having 1 to 30 carbon atoms, with (ii) an alkylalkali metal represented by the formula $R^9M$ in which $T^9$ represents a hydrocarbon group having 1 to 30 carbon atoms and M represents an alkali metal such as Li, K or the like to synthesize an alkali metal amide compound, and then (2) reacting the alkali metal amide compound with (iii) a titanium tetrahalide represented by the general formula $TiX_4^1$ in which $X^1$ represents a halogen atom such as chlorine, bromine, iodine or the like, preferably chlorine.

In the above step (2), the alkali metal amide compound may be used in combination of two or more.

In the present invention, the organomagnesium compound (b) which is one of the catalyst components may be any organomagnesium compound having a magnesium-carbon bond. The organomagnesium compound (b) includes, for example, those represented by the general formula $R^3R^4Mg$ in which $R^3$ and $R^4$ may be the same as or different from each other and each represents a hydrocarbon group having 1 to 20 carbon atoms; those represented by the general formula $R^5MgZ^1$ in which $R^5$ represents a hydrocarbon group having 1 to 20 carbon atoms and $Z^1$ represents a hydrogen atom or an alkoxy group; and those represented by the general formula $R^6MgX^2$ in which $R^6$ represents a hydrocarbon group having 1 to 20 carbon atoms and $X^2$ represents a halogen atom; and the like. In the above case, $R^3$, $R^4$, $R^5$ and $R^6$ may be the same as or different from one another, and include alkyl groups having 1 to 20 carbon atoms, aryl groups having 6 to 20 carbon atoms; aralkyl groups having 7 to 20 carbon atoms and alkenyl groups having 2 to 20 carbon atoms, for example, methyl, ethyl, propyl, isopropyl, butyl, sec-butyl, tert-butyl, amyl, isoamyl, hexyl, octyl, 2-ethylhexyl, phenyl, benzyl, vinyl, 1-propenyl, 2-propenyl and the like.

Among the above magnesium compounds, preferable are those represented by the general formula $R^3R^4Mg$ in view of the chemical composition distribution of the copolymer produced, and those in which $R^3$ and $R^4$ represent aliphatic saturated hydrocarbon groups are more preferable. Specific examples of the magnesium compounds include dimethylmagnesium, diethylmagnesium, dipropylmagnesium, diisopropylmagnesium, dibutylmagnesium, diisobutylmagnesium, di-sec-butylmagnesium, di-tert-butylmagnesium, diamylmagnesium, dineopentylmagnesium, dihexylmagnesium, dicyclohexylmagnesium, methylethylmagnesium, methylpropylmagensium, methylisopropylmagnesium, methylbutylmagnesium, methylisobutylmagensium, methyl-sec-butylmagnesium, methyl-tert-butylmagnesium, methylamylmagnesium, methyl-neopentylmagnesium, methylhexylmagnesium, methylcyclohexylmagnesium, ethylpropylmagnesium, ethylisopropylmagnesium, ethylbutylmagnesium, ethylisobutylmagnesium, ethyl-sec-butylmagnesium, ethyl-tert-butylmagnesium, ethylamylmagnesium, ethylneopentylmagnesium, ethylhexylmagnesium, ethylcyclohexylmagnesium, propylisopropylmagnesium, propylbutylmagnesium, propylisobutylmagnesium, propyl-sec-butylmagnesium, propyl-tert-butylmagnesium, propylamylmagnesium, propylneopentylmagnesium, propylhexylmagnesium, propylcyclohexylmagensium, isopropylbutylmagnesium, isopropylisobutylmagnesium, isopropyl-sec-butylmagnesium, isopropyl-tert-butylmagnesium, isopropylamylmagnesium, isopropylneopentylmagnesium, isopropylheyxlmagnesium, isopropylcyclohexylmagnesium, butylisobutylmagnesium, butyl-sec-butylmagnesium, butyl-tert-butylmagnesium, butylamylmagnesium, butylneopentylmagnesium, butylhexylmagnesium, butylcyclohexylmagnesium, isobutyl-sec-butylmagnesium, isobutyl-tert-butylmagnesium, isobutylamylmagnesium, isobutylneopentylmagnesium, isobutylhexylmagnesium, isobutylcyclohexylmagnesium, sec-butyl-tert-butylmagnesium, sec-butylamylmagnesium, sec-butylneopentylmagnesium, sec-butylhexylmagnesium, sec-butylcyclohexylmagnesium, tert-butylamylmagnesium, tert-butylneopentylmagnesium, tert-butylhexylmagnesium, tert-butylcyclohexylmagnesium, amylneopentylmagnesium, amylhexylmagnesium, amylcyclohexylmagnesium, neopentylhexylmagnesium, neopentylcyclohexylmagnesium, hexylcyclohexylmagnesium and the like.

In view of catalytic activity, $R^3$, $R^4$, $R^5$ and $R^6$ are most preferably alkyl groups having 1 to 4 carbon atoms.

In place of the above magnesium compounds, there may be used hydrocarbon-soluble complexes of said magnesium compound with an organometallic compound. This organometallic compound includes, for example, organic compounds of Li, Be, Al and Zn. In the present invention, the organometallic compounds are not limited to the above-mentioned compounds.

In the present invention, the halogen-containing aluminum compound (c) which is one of the catalyst components may be any known halogen-containing aluminum compound. The halogen-containing aluminum compound (c) includes, for example, halogen-containing aluminum compound (c1) represented by the general formula $R_k^7AlX_{(3-k)}^3$ in which $R^7$ represents a hydrocarbon group having 1 to 20 carbon atoms, $X^3$ represents a halogen atom such as chlorine, bromine, iodine or the like and k represents an integer of 0 to 2, and halogen-containing aluminum compound (c2) represented by the general formula $R_3^8Al_2X_3^4$ in which $R^8$ represents a hydrocarbon group having 1 to 20 carbon atoms and $X^4$ represents a halogen atom such as chlorine, bromine, iodine or the like.

Among the halogen-containing aluminum compounds (c1) represented by $R_k^7AlX_{(3-k)}^3$, preferable are those in which $R^7$ represents a hydrocarbon group having 1 to 10 carbon atoms, and specific examples thereof include, for example, dialkylaluminum halides in which the two alkyl groups are the same such as dimethylaluminum chloride, diethylaluminum chloride, dipropylaluminum chloride, diisobutylaluminum chloride, dibutylaluminum chloride, dihexylaluminum chloride, dioctylaluminum chloride, didecylaluminum chloride and the like; dialkylaluminum halides in which the two alkyl groups are different such as ethylisobutylaluminum chloride and the like; alkylaluminum dihalides such as methylaluminum dichloride, ethylaluminum dichloride, propylaluminum dichloride, isobutylaluminum dichloride, butylaluminum dichloride, hexylaluminum dichloride, octylaluminum dichloride, decylaluminum dichloride and the like; and aluminum trihalides such as aluminum trichloride and the like.

The halogen-containing aluminum compound (c2) represented by the general formula $R_3^8Al_2X_3^4$ is preferably a compound in which $R^8$ is a hydrocarbon group having 1 to 4 carbon atoms and includes, for example, methylaluminum sesquichloride, ethylaluminum sesquichloride, isobutylaluminum sesquichloride and the like.

Among the above halogen-containing aluminum compounds, more preferable are halogen-containing organoaluminum compounds having at least one alkyl group.

The amount of the organomagnesium compound (b) used is such that the atomic ratio of the magnesium atom of the organomagnesium compound (b) to the titanium atom of the titanium compound (a) is preferably 0.01–10,000, more preferably 0.1–5,000 and most preferably 1–2,000.

The amount of the halogen-containing aluminum compound (c) used is such that the atomic ratio of the aluminum atom of the halogen-containing aluminum compound (c) to the titanium atom of the titanium compound (a) is preferably 0.01–100,000, more preferably 0.05–50,000 and most preferably 0.1–10,000.

The relative proportion of the halogen-containing aluminum compound (c) to the organomagnesium compound (b) is preferably 0.01–100, more preferably 0.1–50, in terms of the atomic ratio of the aluminum atom to the magnesium atom.

The above catalyst components are fed to a polymerization tank in an inert gas, for example, nitrogen, argon or the like, in the moisture-free state in the presence of a monomer. The catalyst components (a), (b) and (c) may be separately fed or in admixture of the three components.

The polymerization can be carried out at a temperature ranging from −30° C. to 300° C., preferably from 0° to 280° C., more preferably from 20° to 250° C.

The polymerization pressure is not critical; however, it is preferably about 3 to 150 atms. because this is advantageous industrially and economically.

The polymerization method may be a continuous system or a batchwise system. Moreover, it may be slurry polymerization or solution polymerization in an inert hydrocarbon solvent such as propane, butane, pentane, hexane, heptane or octane, or liquid phase polymerization or gas phase polymerization in the absence of a solvent.

In order to adjust the molecular weight of the copolymer of the present invention, a chain transfer agent such as hydrogen or the like may be added.

The present invention is not restricted at all to the above-mentioned polymerization catalyst and production process.

In order to improve the curability of the copolymer, a diene may be copolymerized. Specific examples of said diene include, for example, 1,3-butadiene, dicyclopentadiene, tricyclopentadiene, 5-methyl-2,5-norbornadiene, 5-methylene-2-norbornene, 5-ethylidene-2-norbornene, 5-isopropenyl-2-norbornene, 5-(2'-butenyl)-2-norbornene, 1,5,9-cyclododecatriene, 6-methyl-4,7,8,9-tetrahydroindene, trans-1,2-divinylcyclobutane, 1,4-hexadiene, 4-methyl-1,4-hexadiene, 1,3-hexadiene, 1,6-octadiene, 6-methyl-1,5-heptadiene and the like. However, in the present invention, the diene is not limited to the above-mentioned examples.

The ethylene-α-olefin copolymer of the present invention is excellent in optical properties and moldability and has good physical properties such as high impact strength, high tensile strength, high rigidity and the like, and hence, is suitable for preparing various packaging films, agricultural films and original films for laminates by an inflation molding method, a T-die extrusion method or the like.

The ethylene-α-olefin copolymer of the present invention is also suitable for preparing blow moldings such as a container for mayonnaise or catsup, a tubular container for cosmetic or paste, a container for seasoning, a thin wall container for inner decoration of corrugated cardboard and metallic container, a container for detergent, cosmetic, drug or the like, etc.; injection moldings such as a lid of vessel, a cap of bottle, a stopper, an inside plug, a cap or cover for parts, artificial lawn, sky shoes, a fender and the like; expansion moldings such as a tray for stretch packaging, an expanded insulating container, a container for convenience foods, and the like; various moldings such as pipes for water service and agriculture, other sundries, industrial parts and the like; coatings for electric wires, cables and the like; sheaths for electric and communication cables; and coatings such as coils, extrusion coatings of steel pipe, by crosshead die and the like.

Moreover, the ethylene-α-olefin copolymer of the present invention can be used to prepare various laminate films and sheets to other films such as polyethylene, biaxially oriented polypropylene, unoriented polypropylene, oriented polyethylene terephthalate, polyethylene terephthalate, biaxially oriented nylon resin, Cellophane, oriented polyvinyl alcohol, polyvinyl alcohol, biaxially oriented saponified ethylene-vinyl acetate resin, saponified ethylene-vinyl acetate resin, ethylene-vinyl alcohol resin, polyvinylidene chloride, polyvinylidene chloride coated biaxially oriented polypropylene, polyvinylidene chloride coated biaxially oriented polyethylene terephthalate, polyvinylidene chloride coated biaxially oriented nylon resin, polyvinylidene chloride coated polyvinyl alcohol, polyvinylidene chloride coated Cellophane, paper, aluminum foil and the like, by various lamination methods such as co-extrusion method, extrusion lamination method, dry lamination method and the like.

The ethylene-α-olefin copolymer of the present invention can also be used in blend with other thermoplastic resins, for example, polyolefins such as high density polyethylene, intermediate density polyethylene, low density polyethylene, polypropylene, poly-1-butene, poly-4-methyl-1-pentene, low crystalline or amorphous ethylene-propylene or -1-butene copolymer, propylene-1-butene copolymer and the like. If necessary, an antioxidant, a weathering agent, an antistatic agent, an antiblocking agent, a slip agent, an antifogging agent, an antifogging agent, a nucleating agent, a pigment, a dyestuff, an inorganic or organic filler and the like may be compounded with the ethylene-α-olefin copolymer.

DESCRIPTION OF THE PREFERRED EMBODIMENTS

The present invention is explained below in more detail by way of Examples; however, the present invention should not be understood to be limited to the Examples.

Incidentally, in the Examples and Comparative Examples, the physical properties were measured by the following methods.

(1) Weight Average Molecular Weight and Number Average Molecular Weight

Measured according to a gel permeation chromatography (GPC) under the following conditions:

Apparatus: Model 150C manufactured by Waters Corporation.

Column: TSK GHM-6 (6 mmφ×600 mm) manufactured by TOSOH CORP.

Solvent: o-Dichlorobenzene (ODCB)

Temperature: 135° C.

Flow rate: 1.0 ml/min

Injection concentration of polymer: 10 mg/10 ml ODCB (injection amount: 500 μl)

Column elution volume was corrected by the universal method using a standard polystyrene available from TOSOH CORP. and Pressure Chemical Corporation.

The ratio of weight average molecular weight Mw to number average molecular weight Mn (Mw/Mn) was determined.

(2) Comonomer Content

Determined by the characteristic absorptions of ethylene and α-olefin using an infrared spectrophotometer.

(3) Melt Flow Rate MFR

Determined according to the method prescribed in JIS K6760.

(4) Density

Determined according to the method prescribed in JIS K6760.

(5) Melt Tension

A predetermined amount of polymer was forcibly extruded from an orifice at 150° C. using Melt Tension Tester Model II manufactured by Toyo Seiki Seisakusho and the tension generated by drawing the polymer to form monofilament was detected by a strain gauge. The tension was measured until the molten polymer in the monofilament form was broken while the speed of drawing was increased at a constant rate by means of a drawing roll, and the maximum value of the tensions obtained from the start of drawing to the breaking was taken as the melt tension.

Extrusion speed: 0.32 g/min
Orifice: 2.095 mm in diameter and 8.000 mm in length
Increasing rate of drawing speed: 6.3 m/min

(6) Activation Energy of Flow Ea

Using a dynamic viscoelasticity measuring apparatus (Model RMS-800 manufactured by Rheometrics Corp.) a disk-like sample having a thickness of about 1 mm and a diameter of about 25 mm sandwiched in between two parallel disks having the same diameter was subjected to measurement of viscoelasticity every 20° C. in the temperature range of from 130° C. to 190° C. in a nitrogen atmosphere under such conditions that the strain was 3% and the frequency was 0.1 to 100 rad/sec.

From the results obtained, master curves of storage rigidity modulus (G') and loss rigidity modulus (G") at 130° C. (403° K.) were prepared.

At this time, the following equations hold:

$G'(\omega, T) = b_T G'(\omega_r, 403° K.)$ $G''(\omega, T) = b_T G''(\omega_r, 403° K.)$ and $\omega_r/\omega$ is taken as a shift factor $a_T$.

In the above equations, $\omega$: frequency (rad/sec) in the measurement
T: temperature (°K.) in the measurement
403° K.: temperature of the master curve
$\omega_r$: frequency (rad/sec) of G' or G" corresponding to G' ($\omega$, T) or G" ($\omega$, T) shifted to the frequency dependency curve of T"
$b_T$: amount of shift in the G' or G" axis direction.

Reciprocal of T is plotted on the axis of abscissa and natural logarithm of $a_T$ at said temperature is plotted on the axis of ordinate to draw an approximate straight line. The inclination of the straight line formed thereby is multiplied by the gas constant (R) and the absolute value of the value obtained thereby is taken as the activation energy of flow Ea (J/mole K).

(7) Coefficient of Variation of Chemical Composition Distribution Cx

Construction of Testing Equipment

On-line degasser: Model ERC-3322 (Elmer)
Pump: Model CCPM (TOSOH)
Electric switching valve: Model MV-8011 (TOSOH)
Injection valve: Model M3-1/16-V6-P-SS (Valco)
Column oven: Model SSP-43CR-43CR-A (Kato)
Detector: Model FT/IR-1760X (Perkin-Elmer)
Fraction corrector: Model MV-8010K (TOSOH)
System controller: Model SC-8010 (TOSOH)

Test Conditions

Solvent: o-dichlorobenzene (ODCB)
Column: 21 mm$\phi$×150 mm L
Filler: Glass beads 500–700 μm
Injection concentration of polymer: 1%
Injection amount: 6 ml
Flow rate of liquid: 2.5 ml/min
Eluting temperature step: Temp.=−10° to 105° C. (38 steps)
Eluting temperature (Ti): −10, 0, 5, 10, 14, 18, 21, 24, 27, 30, 33, 36, 39, 42, 45, 48, 51, 54, 57, 60, 63, 66, 69, 72, 75, 78, 80, 82, 84, 86, 88, 90, 92, 94, 96, 98, 101, 105 (°C.)

The flow path after the column oven was heated to 145° C. Also, before the solvent was allowed to pass through the column, the solvent was preheated in a flow channel of about 20 ml provided in the column oven. FT/IR conditions:

Resolution: 8 cm$^{-1}$
Flow cell: KBr window, cell length=0.5 mm, heated solution flow cell Measurement Method (i) Sample Preparation A solution of polymer having a predetermined concentration was prepared, and heated at 145° C. for four hours.

(ii) Procedure of Temperature Rise Fractionation

1. A polymer solution heated to 145° C. was positioned at the center of the column set in the column oven heated to 145° C. by means of an injection valve and a pump.

2. The temperature of the column oven was lowered from 145° C. to 90° C. at a cooling rate of 0.92° C./min and from 90° C. to −10° C. at a cooling rate of 0.25° C./min while retaining the polymer solution at the center of the column.

3. The column oven temperature was kept at −10° C. for two hours.

4. A solvent was passed into the FT/IR flow cell through the flow path bypassing the column by means of a pump, and the FT/IR background was measured (number of integrations=50). After the measurement of the background, the pump was stopped.

5. The solvent was made ready to flow through the column, and FT/IR measurement was started simultaneously with allowing the solvent to flow through the column by the pump.

Solvent feed time: 25 min
FT/IR integrating time: 25 min (number of integrations=625)

6. The FT/IR spectrum obtained was saved in a floppy disc.

7. After the solvent passed, the column oven temperature was elevated to the next eluting temperature and maintained for 15 minutes.

8. The cycle consisting of the above procedures (4) to (7) was repeated for every eluting temperature.

9. Finally, the column oven temperature was elevated up to 145° C., and a solvent was passed for 25 minutes by means of the pump.

Data Processing

1. The peak area ($S_i$) of the FT/IR spectrum within the IR wave number range of from 2983 to 2816 cm$^{-1}$ was determined.

2. Correction of irregular intervals of eluting temperature was made according to the following equations (3) and (4):

$$H_i = (\Sigma S_i - \Sigma S_{(i-1)})/(T_i - T_{(i-1)}) \tag{3}$$

$$RH_i = H_i/\Sigma H_i \times 10\ (\%) \tag{4}$$

wherein $RH_i$: relative concentration

3. The chemical composition distribution ($SCB_i$) was calculated by the equation (5):

$$SCB_i = 59.70 - 0.599 \times T_i\ (1/1{,}000\ C) \tag{5}$$

wherein $T_i$ is the eluting temperature and $SCB_i$ is the number of short chain branchings per 1,000 C.

4. $SCB_i$ was plotted against $RH_i$ to obtain a chemical composition distribution curve.

5. From the chemical composition distribution curve, the average chemical composition ($SCB_{ave}$) and the coefficient Cx of variation of chemical composition distribution representing the breadth of the distribution were determined according to the following equations (6) and (2), respectively:

$$SCB_{ave} = \Sigma(SCB_i \times RH_i)/\Sigma RH_i\ (1/1{,}000\ C) \tag{6}$$

$$Cx = \sigma/SCB_{ave} \tag{2}$$

wherein $\sigma$ is a standard deviation of chemical composition distribution ($SCB_i$).

(8) Film Formation and Physical Properties

A film having a thickness of 30 μm was produced by using an inflation molding machine of Model EX-50 manufactured by Placo Corporation equipped with a die having a diameter of 125 mm and a die lip of 2 mm at a processing temperature of 160° C. at a blow-up ratio of 1.8 and at a take-off speed of 20 m/min.

The haze of the film obtained was measured by the method prescribed in ASTM D1003.

(9) The Number of Trans-vinylene Type Carbon-carbon Double Bonds per 2000 Carbons (TVN) and the Ratio of Trans-vinylene Type Carbon-carbon Double Bonds to Total Carbon-carbon Double Bonds per 2000 Carbons (TVR)

An infrared absorption spectrum from 1000 cm$^{-1}$ to 800 cm$^{-1}$ was determined with an infrared spectroscopic analyzer using 0.5 mm thickness of a press sheet obtained by press molding of the copolymer. On said spectrum, a baseline was drawed from 980 cm$^{-1}$ to near 860 cm$^{-1}$ through 950 cm$^{-1}$, then a vertical line was drawed from the peak of an absorption spectrum of an objective wave number (transvinylene type; 965 cm$^{-1}$, vinyl type; 909 cm$^{-1}$, vinylidene type; 888 cm$^{-1}$) to the baseline. The transmittance I was determined from an intersecting point of the vertical line and the absorption spectrum, and the transmittance $I_0$ was determined from an intersecting point of the vertical line and the baseline, then the number of each carbon-carbon double bonds per 2000 carbons (TVN) was calculated by the following formulas (i)–(iv).

The number of trans-vinylene type carbon-carbon double bonds/2000 carbons
$$(TVN) = 0.328 \cdot f \cdot K'\ (965\ cm^{-1}) \tag{i}$$

The number of vinyl type carbon-carbon double bonds/2000 carbons $= 0.231 \cdot f \cdot K'\ (909\ cm^{-1})$ (ii)

The number of vinylidene type carbon-carbon double bonds/2000 carbons $= 0.271 \cdot f \cdot K'\ (888\ cm^{-1})$ (iii)

$K'$ (wave number) $= (\log I_o - \log I)/(\rho \cdot l)$ (iv)

ρ: A density of sample (g/cm$^3$)
l: A thickness of a sample (cm)
f: Determined by the above formula (i)–(iv) in measurement of the standard sample having known numbers of respective carbon-carbon double bonds. It is usually in the range of 0.900–1.100.

From thus obtained numbers, the ratio of trans-vinylene type carbon-carbon double bonds to total carbon-carbon double bonds per 2000 carbons (TVR) was determined and expressed as a percentage.

EXAMPLE 1

Synthesis of Titanium Compound

A 3-liter flask equipped with a stirrer, a dropping funnel and a thermometer was purged with an argon gas and thereafter charged with 181 ml (600 millimoles) of dioctylamine and 1.5 liters of hexane.

Subsequently, 387 ml (600 millimoles) of butyllithium diluted with hexane was dropped from the dropping funnel into the solution in the flask while the temperature of the solution was kept at 5° C. over a period of 30 minutes, after which the resulting mixture was subjected to reaction at 5° C. for two hours and then at 30° C. for two hours.

Subsequently, 16.5 ml (150 millimoles) of TiCl$_4$ diluted with hexane was dropped from the dropping funnel into the above reaction mixture over a period of 30 minutes while the temperature of the reaction mixture was kept at 5° C., and after completion of the dropwise addition, the resulting mixture was subjected to reaction at 5° C. for one hour and then at 30° C. for two hours, to obtain 150 millimoles of a titanium compound represented by the composition formula $[(C_8H_{17})_2N]_4Ti$.

Polymerization of Ethylene

In a 1-liter autoclave type continuous reaction vessel equipped with a stirrer, ethylene and butene-1 were copolymerized using the above reaction product under the following reaction conditions.

Reaction Conditions

Halogen-containing aluminum compound: Diethylaluminum chloride (DEAC)
Organomagnesium compound: Butylethylmagnesium (BEM)
Al/Ti atomic ratio: 126
Mg/Ti atomic ratio: 29.4
Polymerization temperature: 210° C.
Polymerization pressure: 702 kg/cm$^2$
Polymerization residence time: 45 seconds
Amount of ethylene fed: 817 kg/hr Amount of butene-1 fed: 10.4 kg/hr As a result of the polymerization, 2.4 kg of a copolymer was obtained per one hour.

The physical properties of the copolymer obtained; the number of screw revolutions, extrusion amount, load current and extrusion pressure in the film formation; and the haze of film obtained are shown in Table 1.

COMPARATIVE EXAMPLE 1

Physical properties of commercially available LLDPE [Sumikathene-L (registered trade mark) FA201-0 (comonomer: butene-1) manufactured by Sumitomo Chemical Co., Ltd.] were measured in the same manner as in Example 1, to obtain the results shown in Table 1.

EXAMPLE 2

The same procedure as in Example 1 was repeated, except that the polymerization of ethylene was conducted under the following conditions:

Al/Ti atomic ratio: 53

Mg/Ti atomic ratio: 13.4

Polymerization pressure: 762 kg/cm$^2$

Amount of ethylene fed: 8.5 kg/hr

Amount of butene-1 fed: 10.9 kg/hr

As a result of the polymerization, 1.9 kg of a copolymer was obtained per one hour.

Physical properties of the copolymer obtained were measured in the same manner as in Example 1 to obtain the results shown in Table 2.

COMPARATIVE EXAMPLE 2

Physical properties of commercially available LLDPE [UF 230 (comonomer: butene-1) manufactured by Mitubishi Petrochemical Co., Ltd.] were measured in the same manner as in Example 1 to obtain the results shown in Table 2.

COMPARATIVE EXAMPLE 3

Physical properties of commercially available LLDPE [Tafmer A4085 (comonomer: butene-1) manufactured by Mitsui Petrochemical Co., Ltd.] in the same manner as in Example 1, to obtain the results shown in Table 2.

TABLE 1

|  | Example 1 | Comp. Ex. 1 |
|---|---|---|
| Mw | 75,000 | 105,000 |
| Mw/Mn | 4.6 | 4.9 |
| MFR (g/10 min) | 3 | 2 |
| Density (g/cm$^3$) | 0.928 | 0.918 |
| Melt tension (g, 150° C.) | 3.5 | 1.8 |
| Ea (J/mole K) | 47,000 | 29,000 |
| Cx | 0.46 | 0.63 |
| TVR (%) | 10.2 | — |
| Comonomer content (mole %) | 2.9 | 3.9 |
| (Film processing) | | |
| Processing temp. (°C.) | 160 | 160 |
| No. of revolutions (rpm) | 58 | 48 |
| Extrusion amount (kg/hr) | 25 | 26 |
| Load current (amp) | 26 | 51 |

TABLE 1-continued

|  | Example 1 | Comp. Ex. 1 |
|---|---|---|
| Extrusion pressure (kg/cm$^2$) | 85 | 150 |
| Film haze (30μ) | 23.5 | 32.3 |

TABLE 2

|  | Example 2 | Comp. Ex. 2 | Comp. Ex. 3 |
|---|---|---|---|
| Mw | 89,000 | 94,000 | 74,000 |
| Mw/Mn | 4.3 | 3.7 | 1.8 |
| MFR (g/10 min) | 1 | 1 | 4 |
| Density (g/cm$^3$) | 0.927 | 0.920 | 0.887 |
| Melt tension (g, 150° C.) | 6.5 | 3.3 | 0.8 |
| Ea (J/mole K) | 78,000 | 29,000 | 33,000 |
| Cx | 0.51 | 0.72 | 0.13 |
| TVR (%) | 2.3 | — | — |
| Comonomer content (mole %) | 2.9 | 3.4 | 8.8 |

What is claimed is:

1. An ethylene-α-olefin copolymer in which (A) a density is 0.870 to 0.945 g/cm$^3$, (B) a relation between an activation energy of flow Ea (J/mole K) obtained by measurement of viscoelasticity at at least three temperatures in the molten state and a melt flow rate MFR (g/10 min) satisfies the following equation (1):

$$\log Ea \geq 4.6 - 0.04 \times \log MFR \tag{1}$$

(C) a coefficient Cx of variation of chemical composition distribution represented by the following equation (2) is 0.40 to 0.80:

$$Cx = \sigma/SCB_{ave} \tag{2}$$

wherein σ is a standard deviation of chemical composition distribution (1/1,000 C) and $SCB_{ave}$ is the average of short chain branchings per 1,000 C (1/1,000 C), (D) a ratio of a weight average molecular weight Mw to a number average molecular weight Mn (Mw/Mn) is 3 to 20, and (F) a ratio (TVR) of trans-vinylene type carbon-carbon double bonds to total carbon-carbon double bonds as determined with an infrared absorption spectrum being 1 to 30%.

2. The ethylene-α-olefin copolymer according to claim 1, wherein (E) a weight average molecular weight is 30,000 to 600,000.

3. The ethylene-α-olefin copolymer according to claim 1, wherein (A) the density is 0.885 to 0.935 g/cm$^3$.

4. The ethylene-α-olefin copolymer according to claim 1, wherein (C) the coefficient Cx is 0.45 to 0.75.

5. The ethylene-α-olefin copolymer according to claim 1, wherein (D) the ratio (Mw/Mn) is 3 to 10.

6. The ethylene-α-olefin copolymer according to claim 1, wherein (D) the ratio (Mw/Mn) is 3 to 5.

7. The ethylene-α-olefin copolymer according to claim 1, wherein (E) the weight average molecular weight is 40,000 to 400,000.

8. A molded article formed from the ethylene-α-olefin copolymer according to claim 1.

9. A molded article formed from the ethylene-α-olefin copolymer according to claim 2.

* * * * *